United States Patent
Lunde

(10) Patent No.: US 6,731,429 B2
(45) Date of Patent: May 4, 2004

(54) PROJECTION SYSTEM EMPLOYING A SCREEN WITH MOVING WATER

(75) Inventor: Montgomery C. Lunde, Santa Clarita, CA (US)

(73) Assignee: Technifex, Inc., Valencia, CA (US)

( * ) Notice: Subject to any disclaimer, the term of this patent is extended or adjusted under 35 U.S.C. 154(b) by 0 days.

(21) Appl. No.: 10/063,265

(22) Filed: Apr. 4, 2002

(65) Prior Publication Data

US 2003/0189753 A1 Oct. 9, 2003

(51) Int. Cl.[7] .................. G03B 21/56; G03B 21/60; G03B 21/00; G03B 21/26; F21S 8/00
(52) U.S. Cl. .................. 359/443; 359/460; 353/28; 353/122; 239/18
(58) Field of Search ................ 359/443, 460; 239/18; 353/122, 28, 62

(56) References Cited

U.S. PATENT DOCUMENTS

| | | | |
|---|---|---|---|
| 1,446,266 A | 2/1923 | Murray | 359/450 |
| 1,631,240 A | 6/1927 | Amet | 353/54 |
| 3,964,194 A | 6/1976 | Gugeler | 40/106.21 |
| 5,067,653 A | 11/1991 | Araki et al. | 239/18 |
| 5,167,368 A | 12/1992 | Nash | 239/17 |
| 5,288,018 A * | 2/1994 | Chikazumi | 239/18 |
| 5,445,322 A | 8/1995 | Formhals et al. | 239/18 |
| 5,989,128 A | 11/1999 | Baker et al. | 472/65 |
| 6,183,092 B1 * | 2/2001 | Troyer | 353/31 |
| 6,279,835 B1 | 8/2001 | Hansen | 239/20 |
| 6,414,789 B2 * | 7/2002 | Braun | 359/460 |

OTHER PUBLICATIONS

Midwest Tropical, "Aqua Falls", found at http://www.midwest-tropical.com/products/aquafall.htm, publication date unknown.

* cited by examiner

*Primary Examiner*—Christopher E Mahoney
(74) *Attorney, Agent, or Firm*—Holland & Hart LLP; Christopher J. Kulish, Esq

(57) ABSTRACT

The present invention is directed a projection system that produces a visual special effect. In one embodiment, the system includes a projector, a translucent projection substrate, a flow disturbance structure associated with one side of the substrate, and a water system for distributing water over the side of the substrate with which the flow disturbance structure is associated.

20 Claims, 8 Drawing Sheets

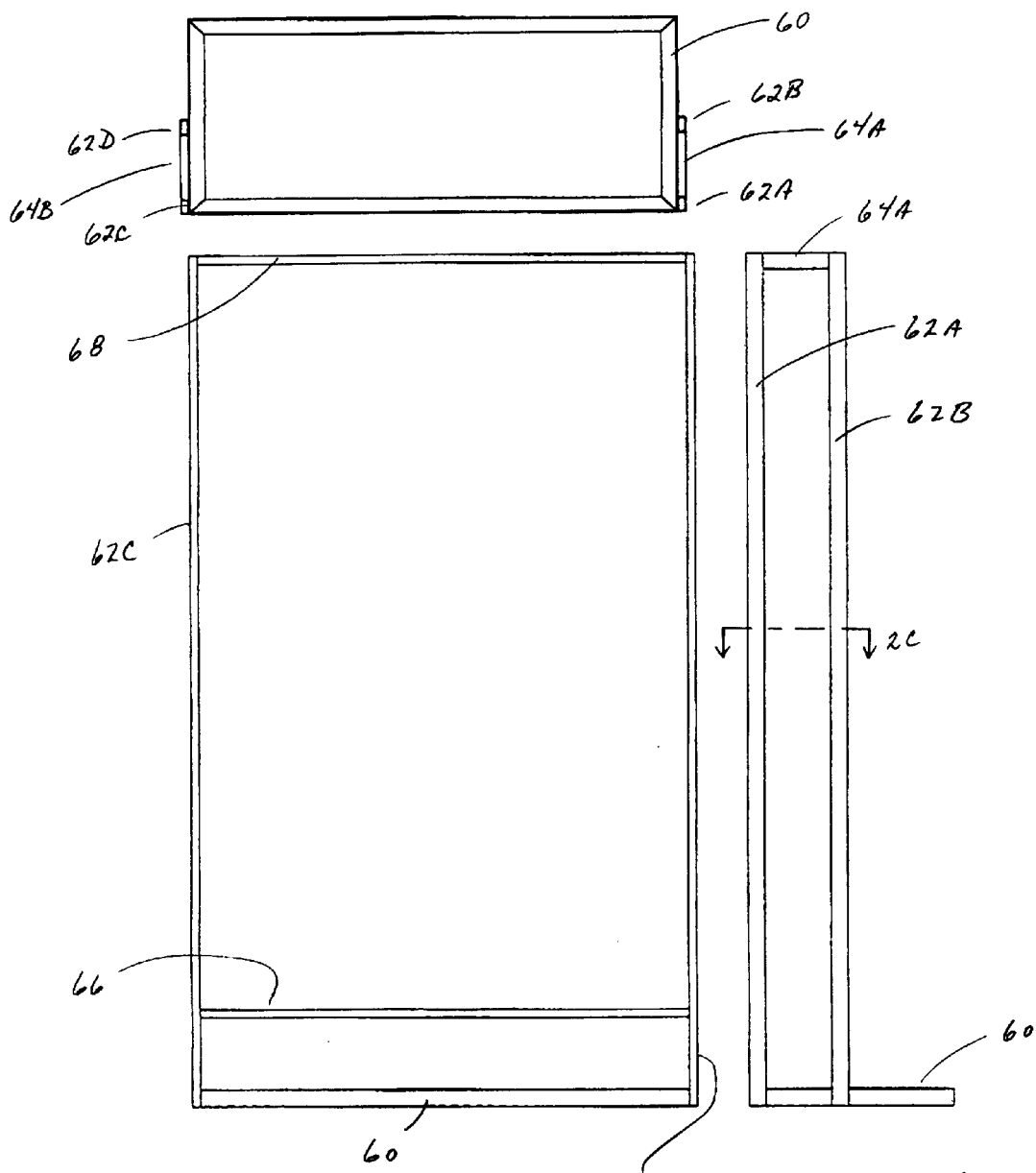

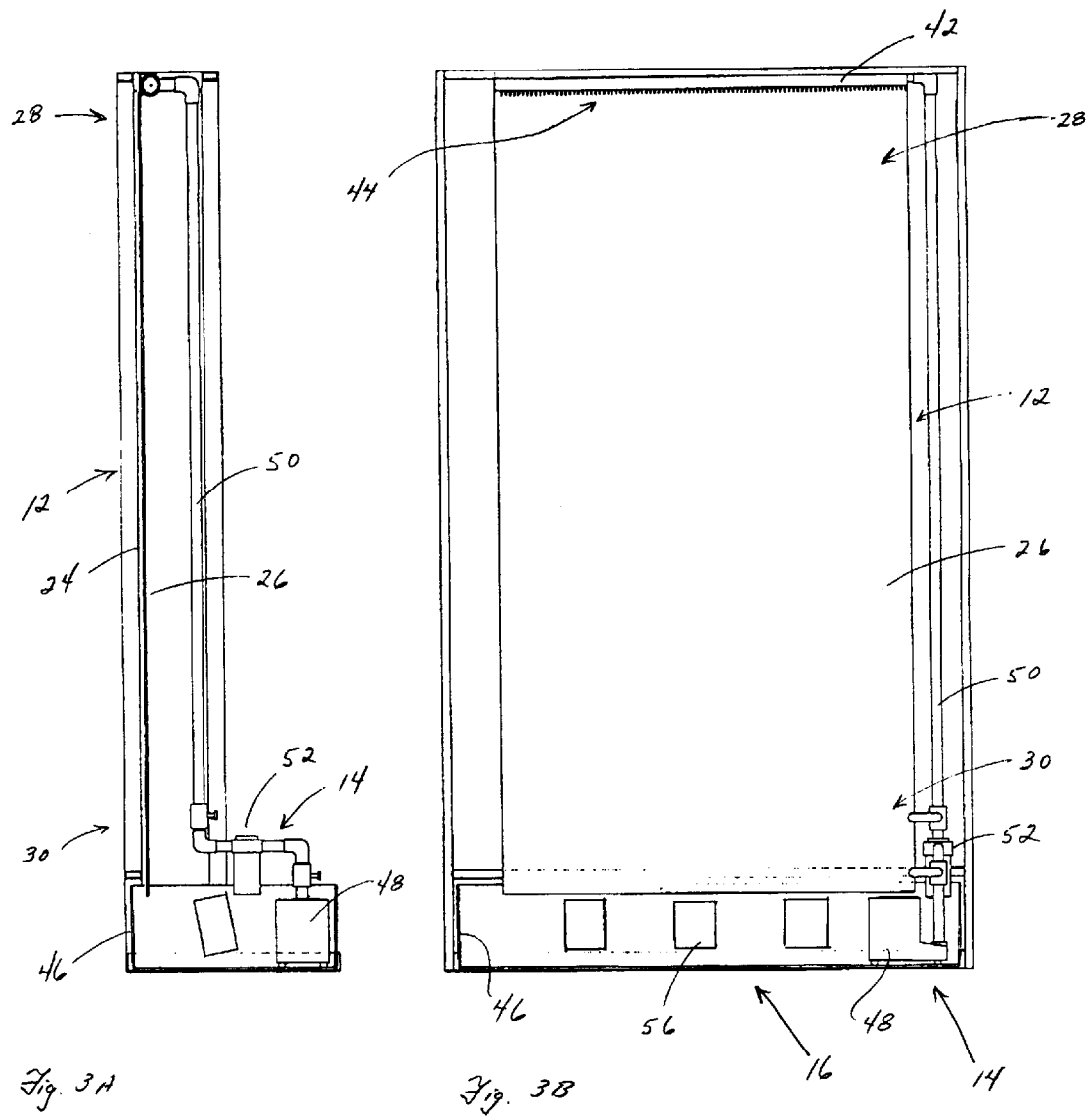

PROJECTION SYSTEM EMPLOYING A SCREEN WITH MOVING WATER

FIELD OF THE INVENTION

The present invention relates to a projection system and, in particular, to a projection system that produces a distorted image.

BACKGROUND OF THE INVENTION

There are a number of projection systems that employ water as part of a screen or to form screen. In one such projection system, a screen is formed by using a line of water nozzles to create a curtain of mist and lines of air nozzles that are located on each side of the line of water nozzles to create curtains of air that bracket the curtain of mist. The air curtains constrain the mist curtains so as to form a screen of mist that has a substantially uniform thickness. An example of such a projection system can be found in U.S. Pat. No. 5,989,128.

Also know are projection systems in which a motion picture screen is formed by flowing a liquid, such as water, over a reticulated or woven, light-absorbing material. Apparently, the images produced on such screens are clearer than the images produced on reticulated screens without the benefit of flowing water. An example of such a projection system is disclosed in U.S. Pat. No. 1,631,240.

Projection systems are also known in which a motion picture screen is formed from an enameled or porcelain surface and a glass or translucent plate disposed in front of the porcelain surface. The enameled or porcelain surface and glass or translucent plate are joined so as to form a chamber. A water supply pipe is situated at the top of the chamber and operates to project water against the inner surfaces of the enameled or porcelain surface and the glass or translucent plate. Apparently, the water contributes to softening glare and reducing flicker that would otherwise be present. An example of such a projection system is disclosed in U.S. Pat. No. 1,446,266.

SUMMARY OF THE INVENTION

The present invention is directed to a projection system that produces a distorted image for the viewer. In one embodiment, the projection system comprises a projection substrate with two sides. On one side of the projection substrate is a flow disturbance structure that, when the system is in operation, imparts a rippling effect to the water that is flowing over the projection substrate. The system further comprises a water system that serves to distribute the water that flows over the side of the projection substrate on which the flow disturbance structure is located. A projector operates to project an image towards the projection substrate. In operation, a projection screen is formed by the projection substrate and the rippling water that is created by the water provided by the water system flowing over the flow disturbance structure associated with the substrate. When the projector projects an image onto this screen, the screen operates to distort the image for the viewer. Typically, the system is configured so that the distortion imposed on the image creates a distorted but aesthetically pleasing image, such as a "shimmering" image, but less aesthetically pleasing distortions are also feasible.

In another embodiment, the projection system comprises a translucent projection substrate with one side of the substrate having a flow disturbance structure (e.g., a series of grooves) for imparting a rippling effect to water that flows over that side of the projection substrate. The system further comprises a water system for distributing water over the side of the projection substrate on which the flow disturbance structure is located and a projector for projecting an image towards the projection substrate. The projector is located so as to project the image towards the back or non-viewer side of the projection substrate. The translucent characteristic of the projection substrate allows the image to be viewed from the front or viewer side of the projection substrate. In such a system, the water system is adapted to distribute water for flowing over either the back or front side of the projection substrate. In either case, an image that is projected onto the screen formed by the substrate and the rippling water is distorted when the image is viewed from the front side of the substrate. In one embodiment, the water system is adapted to allow the water to flow over the back side of the projection screen so that the front side of the projection substrate is dry and, if desired, can be touched by a viewer.

In another embodiment, the water system is adapted to allow water to flow over the front and back sides of the projection substrate. In such an embodiment, there are two flow disturbance structures, one associated with each side of the projection substrate, for producing two, rippling cascades of water. By using one type of flow disturbance structure on one side of the projection substrate and another type of flow disturbance structure on the other side of the projection substrate, the image seen by the viewer can be distorted in two, overlapping ways.

Yet another embodiment of the invention comprises a projection substrate, a flow disturbance structure that is located on one side of the substrate and operates to impose a rippling effect on water that flows over the surface, and a lighting structure that projects light toward the projection surface such that the light, during operation, engages the rippling water at a "raking" angle. The interaction of the light with the rippling water causes noticeable brightness variations in the image of the rippling water seen by a viewer. Further, by using colored light (i.e. non-white light), color can be imparted to the rippling water. For instance, by using red/orange light and the appropriate flow disturbance structure, an image similar to flowing lava is generated for the viewer.

DETAILED DESCRIPTION

Figure 1A:
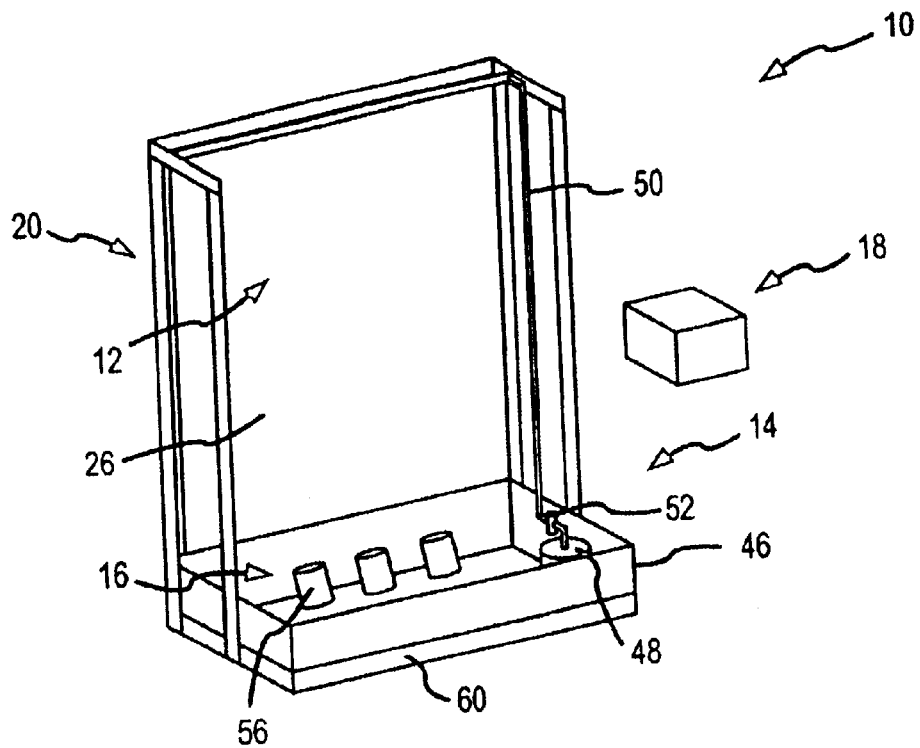
FIGS. 1A and 1B respectively are rear and front perspective views of an embodiment of the invention.
Figure 1B:
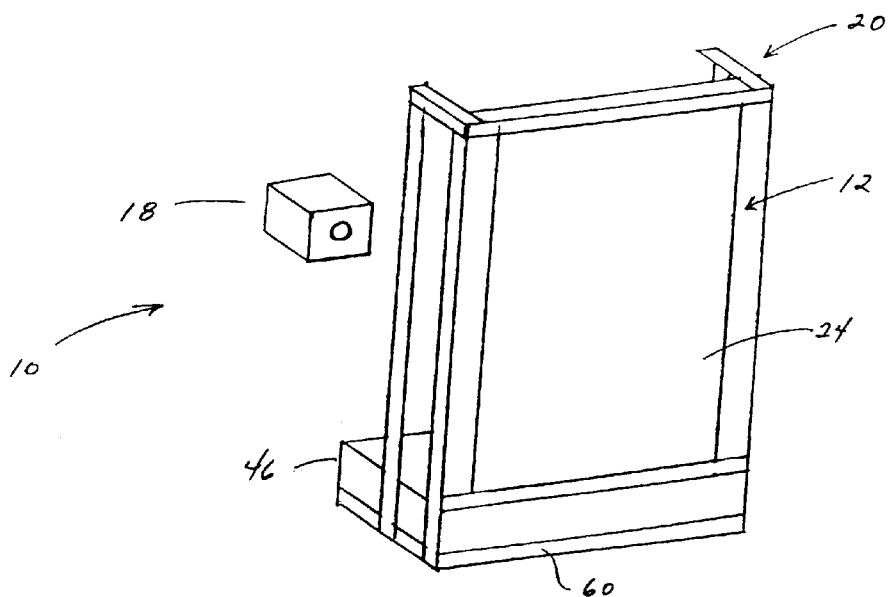

The present invention is directed to a projection system that provides the viewer with a distorted image of an image produced by a projector. Generally, the system is comprised of a projection substrate, a water system for dispensing water that flows over at least one side of the projection substrate, and a projector for projecting an image onto the projection substrate. A flow disturbance structure is associated with the side of the projection substrate over which water flows during operation of the system. When the system is in operation, a projection screen is formed by the projection substrate and the rippling water created by water flowing over the flow disturbance structure. The projection screen affects the image produced by the projector such that a distorted image is presented to a viewer looking at the screen.

With reference to FIGS. 1–5, an embodiment of a projection system that produces a distorted image for a viewer, hereinafter referred to as system 10, is described. Generally, the system 10 comprises a translucent projection substrate 12, a water distribution system 14 for providing the water that flows over at least one surface of the translucent projection surface 12, a lighting system 16, a projector 18, and a frame 20 for supporting the projection substrate 12, water distribution system 14, and lighting system 16.

The translucent projection substrate 12 is a rectangular sheet that has a front or viewer side 24, a back or non-viewer side 26, a top end 28, and a bottom end 30. It should be appreciated that a suitable translucent substrate is not constrained to being a planar sheet, as substrate 12, but can have a three dimensional characteristic, if desired. For instance, a suitable translucent substrate can be in the form of a section of a cylinder. Further, a suitable translucent substrate is not constrained to having an edge that defines a rectangle. For example, the substrate can have an edge that defines a circle.

The front surface 24 of the substrate 12 is frosted to form a surface upon which the distorted image can be created and viewed. The frosted character of the surface 24 is created by sandblasting, sanding or abrading a sheet of clear acrylic plastic to remove material from the sheet. Consequently, the frosting renders the sheet of previously clear acrylic plastic translucent. The frosted character can also be created by the application of paints and sprays known in the art. Further, material can be removed or added to materials other than clear acrylic plastic, such as glass, to create the frosted character of the front surface 24. Further, if desired, suitable clear, colored materials can also be utilized to create the substrate 12. For instance, clear red acrylic plastic or glass can be treated to create the frosted front surface 24 of the substrate 12.

While the frosted character of the front surface 24 renders the substrate translucent, it should be appreciated that the translucent aspect of the substrate can be realized in a number of ways known to those in the art. For instance, a translucent sheet of polymeric material can be sandwiched between sheets of glass or plastic. Another possibility is to place a dopant in a suitable matrix, such as glass or plastic. In any event, any translucent material that provides a surface or effectively provides a surface on which an image can be formed and viewed is adequate.

The backside 26 comprises an area 32 (see FIG. 4) that receives multiple streams of water from the water distribution system 14. All or part of the area 32 is frosted or otherwise treated to facilitate the dispersal of the multiple streams of water and thereby produce a substantially even sheet of water.

Figure 4:
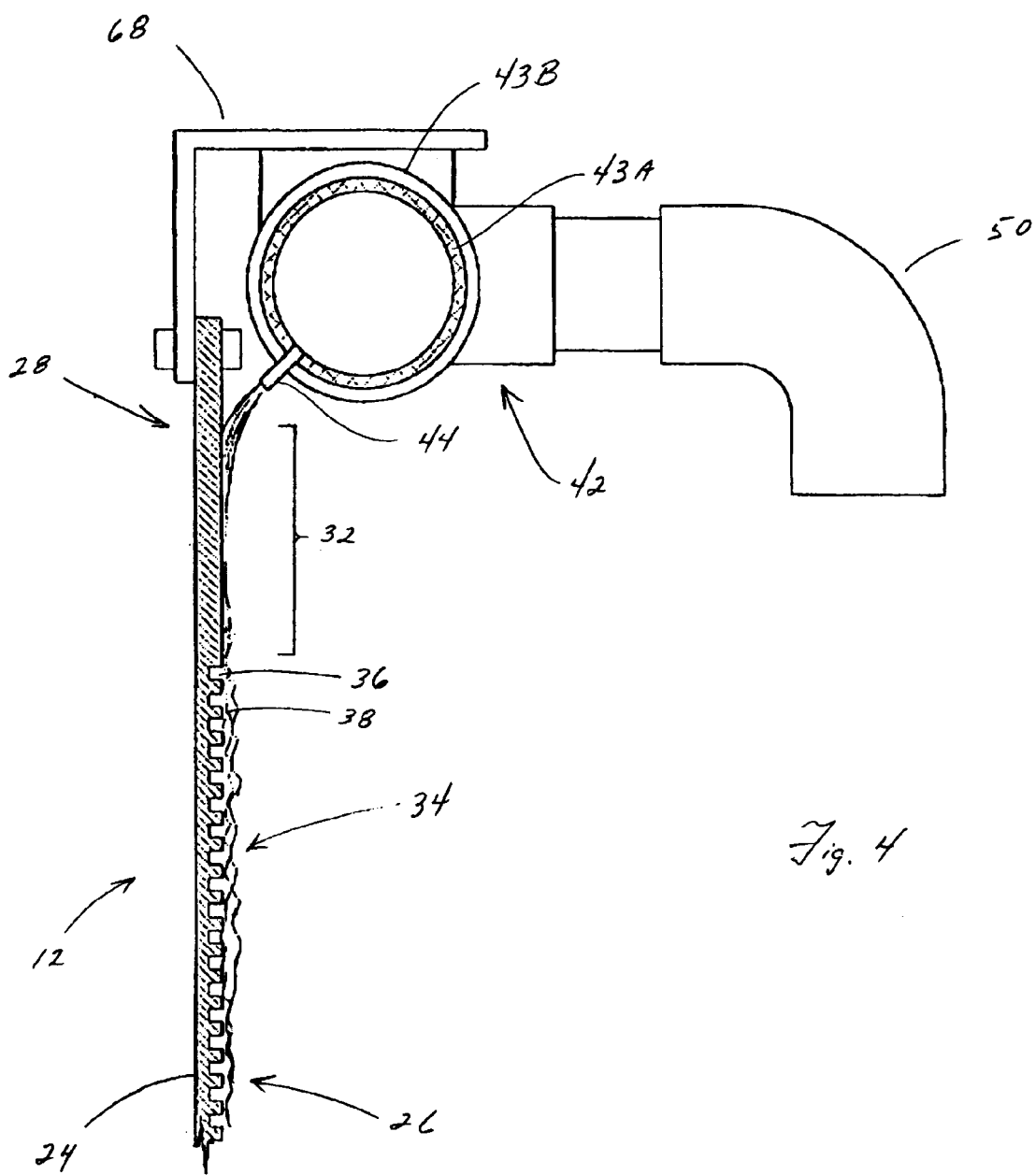
FIG. 4 is a detailed diagram that shows the relationship of a portion of the frame, projection substrate and cross-section of the water manifold for the embodiment of the invention shown in FIG. 1.
Figure 8:
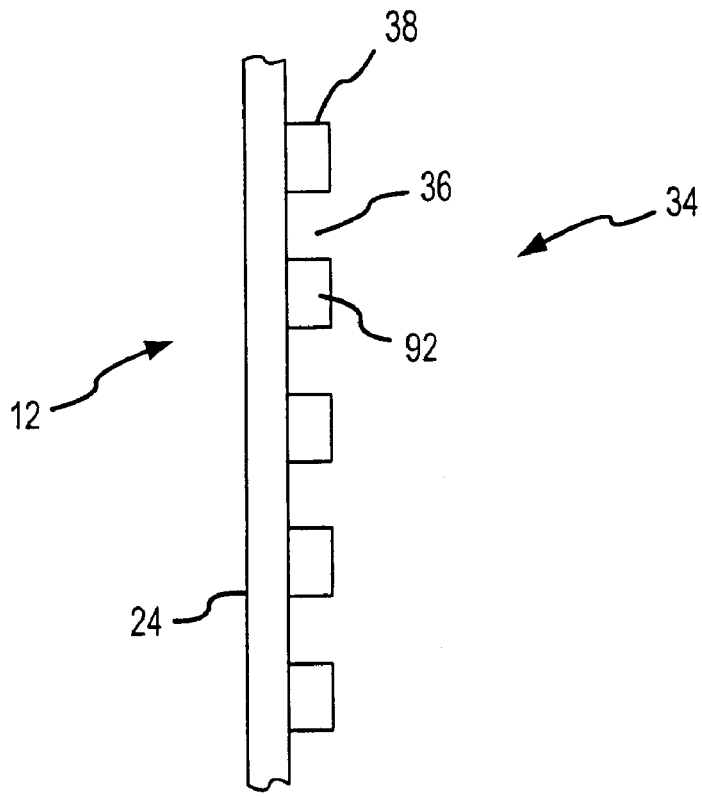
FIG. 8 illustrates the use of appliqués to realize a flow disturbance structure.

The back side 26 further comprises a flow disturbance structure 34 that imparts a rippling effect to water that flows over the back side 26. The flow disturbance structure 34 is a series of substantially parallel grooves 36 of rectangular cross-section that are separated by a series of substantially parallel lands 38. The flow disturbance structure 34 is created by removing material from whatever material is used for the substrate 12 to create the grooves 36 and thereby create the lands 38. If a different rippling effect is desired, grooves with a different spacing, depth and/or profile (e.g., saw tooth) than the grooves 36 can be created. Further, grooves that are not parallel to one another can also be used to create a different rippling effect. It should also be appreciated that flow disturbance structures other than the flow disturbance structure 34 are possible. For instance, a flow disturbance structure of hemispherical blisters, pyramids, "moons" etc. or combinations there are possible. Further, it should also be appreciated that comparable flow disturbance structures can be realized by applying material to whatever material is used to create the substrate. For example, FIG. 8 illustrates the same flow disturbance structure 34 as shown in FIG. 4 but with the grooves 36 and lands 38 realized by the adherence of appliqués 92 to the substrate 12.

The water distribution system 14 comprises a water manifold 42 with a plurality of holes 44 that distribute water across the top end 28 of the projection substrate 12, a reservoir 46 for receiving water that has been distributed over the top end 28 of the substrate 12 and has flowed over the back side 26 of the substrate 12, a pump 48 for recirculating water from the reservoir 46 to the water manifold 42 via piping 50, and a filter 52 interposed between the pump 48 and the manifold 42 to remove foreign materials that could interfere with the operation of the manifold 42. In the illustrated embodiment, the manifold 42 comprises a pipe 43A and an L-section 43B that directs water into the pipe 43B.

It should be appreciated that a water distribution system that recirculates water, such as system 14, may be unnecessary in applications in which there is a reliable source of flowing water and adequate drainage. In such applications, the water distribution system is comprised of a water manifold that is capable of receiving water from the source of flowing water and distributing the received water across the top end 28 of the substrate 12. The reservoir 46, pump 48, and piping 50 are not required. However, a filter between the source of flowing water and the water manifold may be needed if the source of flowing water is likely to carry contaminants that could interfere with the operation of the manifold. It should also be appreciated that a manifold that utilizes a slot instead of holes 44 is also feasible.

The lighting system 16 comprises one or more lights 56 that operate to project light on the rippling water that flows down the back side 26 of the substrate 12 such that the image of the rippling water produced on the front side 24 of the substrate 12 is accentuated by variations in brightness. To achieve noticeable or meaningful accentuation, the light or lights 56 must be oriented to project light at a "rakish" angle, i.e., an angle that intersects a portion of the crest or crests of the ripples produced by whatever flow disturbance structure is utilized so as to produce "shadows". For the plane wave produced by the flow disturbance structure 32, the light produced the lights 56 is directed substantially upward and at an angle of no more than about 5–10 degrees relative to the back side 26 of the substrate. However, angles of no more than about 25 degrees are also feasible. While the light or lights 56 are shown as being located in the reservoir 46 for the flow disturbance structure 32, other locations are feasible. For instance, one or more lights can be located adjacent to the top end 28 of the substrate 12 and directed downward at the appropriate "rakish" angle. Further, the flow disturbance structure utilized may produce ripples that require the light or lights 56 to be located in one or more different locations to achieve a noticeable or meaningful accentuation of the image of the ripples produced on the front side of the substrate 24. The light or lights can also be colored to produce certain types of images. For instance, by selection of an appropriate flow disturbance structure and the use of red/orange lights, an image is produced on the front side 24 of the substrate 12 that is similar to flowing lava. Further, if there is more than one light 56 in the lighting system, the lights can be different colors.

The projector 18 is located behind the projection substrate 12 and is oriented to project an image towards the substrate 12. The projector 18 can be any kind of projection device, including a moving picture projector, slide projector or video projector, each of which includes a lamp, lens and image plane located between the lamp and the lens. The projector 18 can also be a shadow box structure that includes a lamp and a box or aperture structure located between the lamp and the substrate 12 that is capable of holding objects that are used to form an image.

Figure 5:
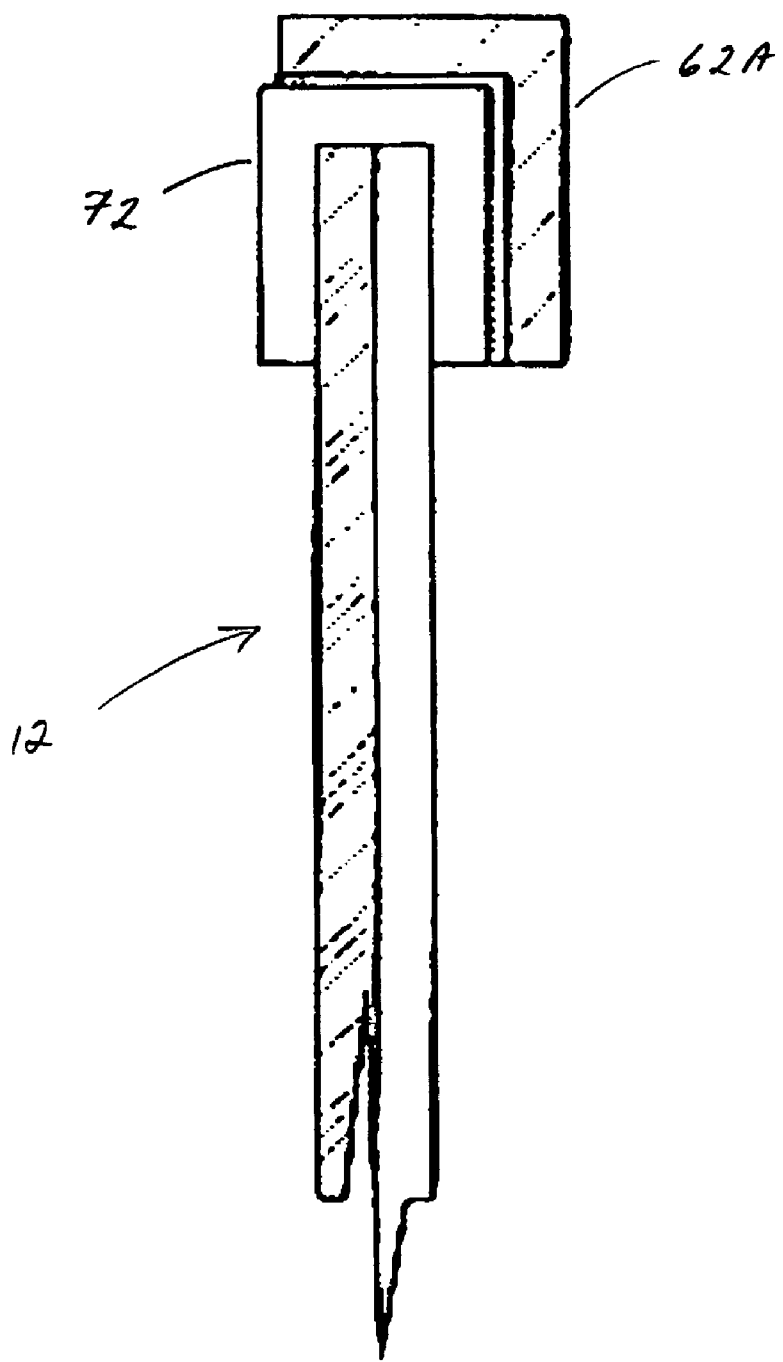
FIG. 5 is a detailed diagram of the connection between the projection substrate and the sides of the frame for the embodiment of the invention shown in FIG. 1.
Figure 2C:
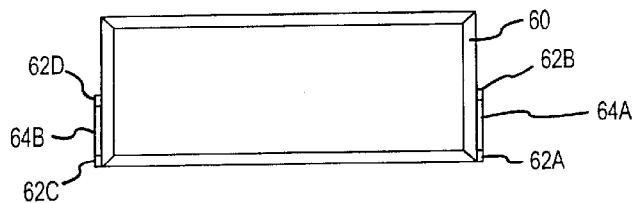
FIGS. 2A–2C respectively are front, side and top orthogonal views of the frame used in the embodiment of the invention shown in FIG. 1.
Figure 2A:
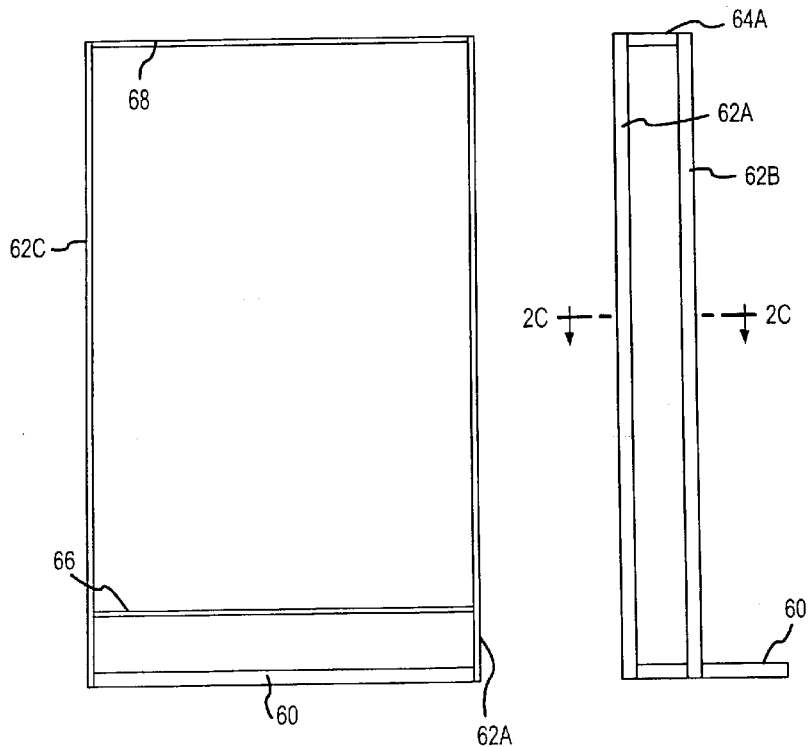
Figure 2B:
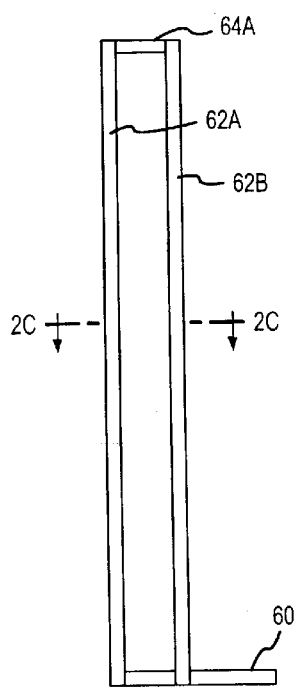
Figures 3A, 3B:
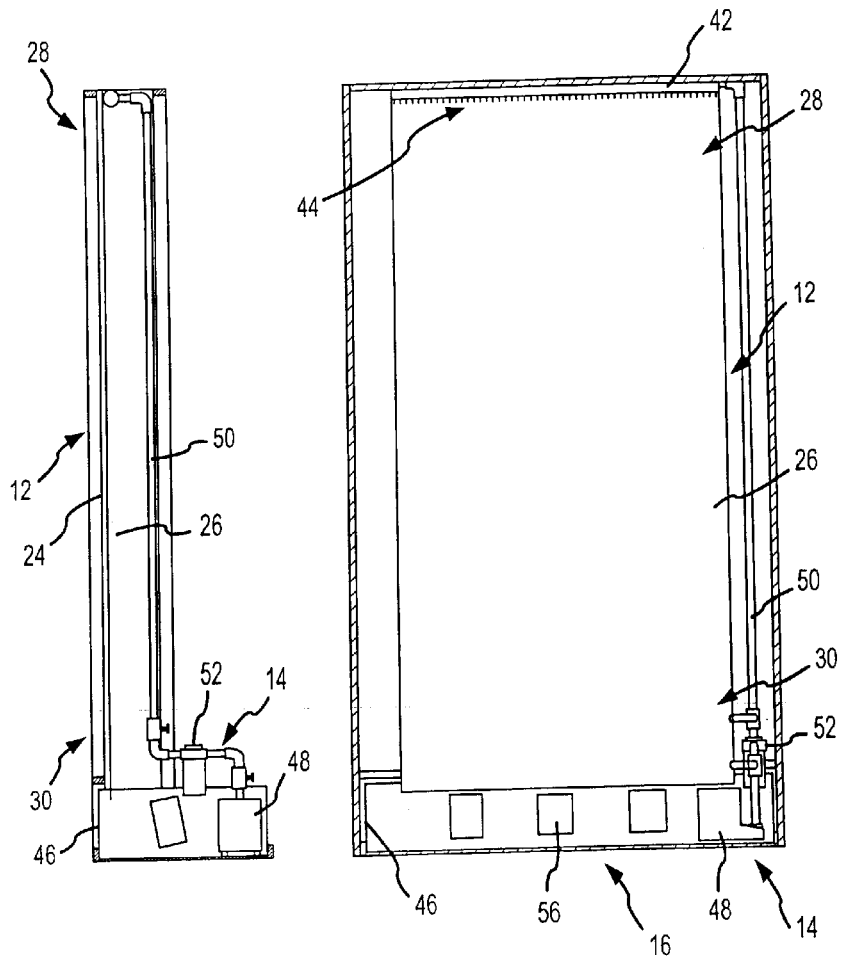
FIG. 3A is a side cross-sectional view of a portion of the embodiment of the invention shown in FIG. 1.
FIG. 3B is a rear cross-sectional view of a portion of the embodiment of the invention shown in FIG. 1.
Figure 4:
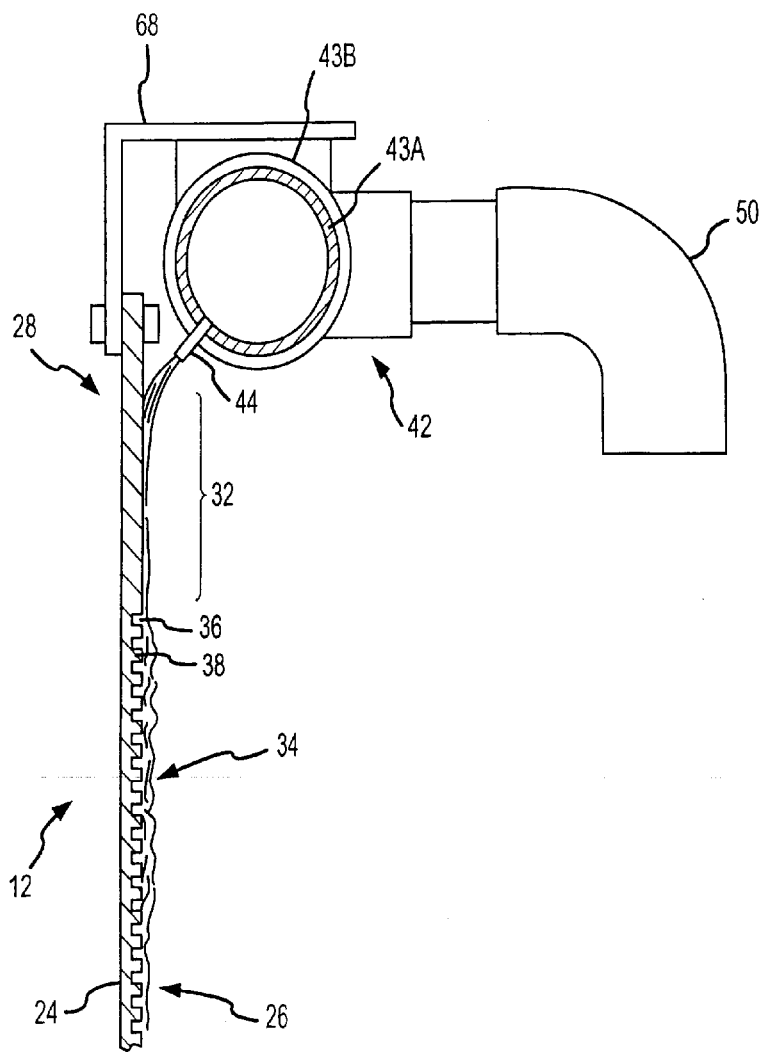
Figure 5:
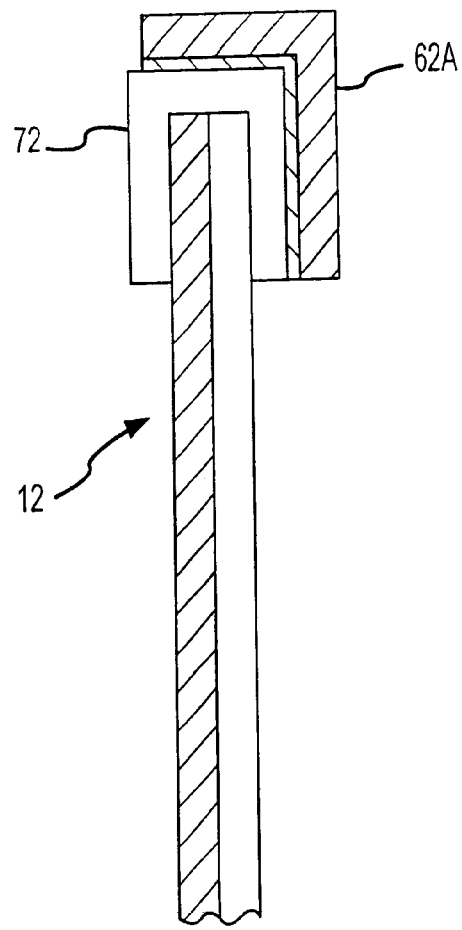
Figure 6A:
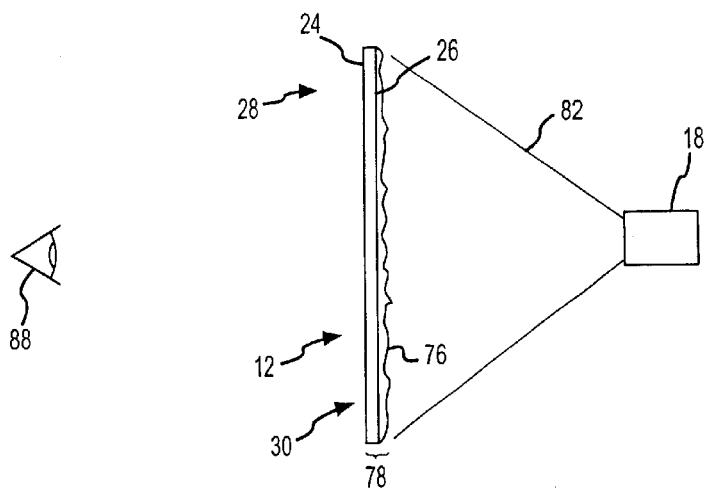
Figure 6B:
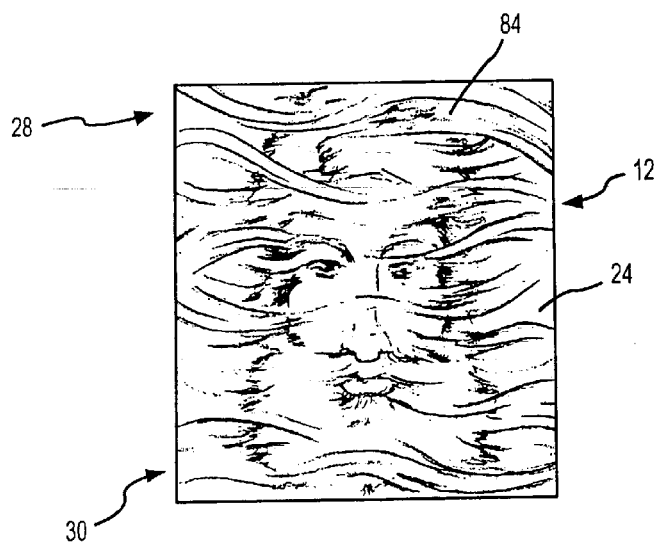
Figure 7A:
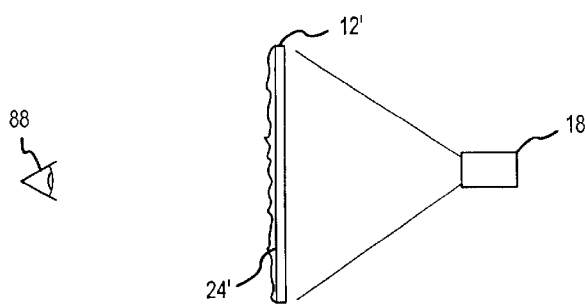
Figure 7B:
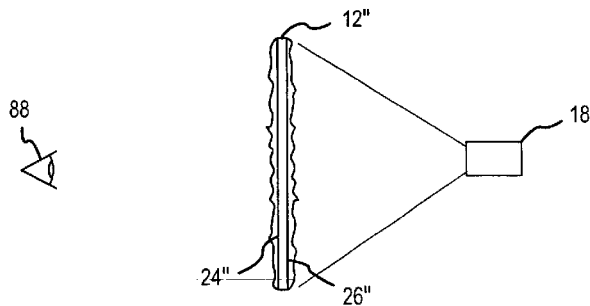
Figure 7C:
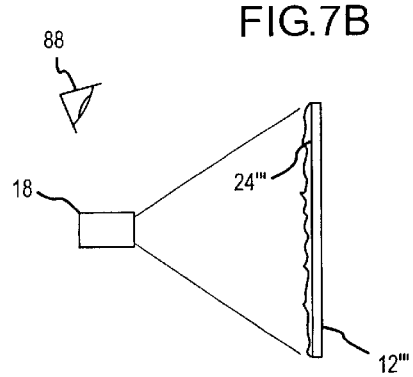
Figure 7D:
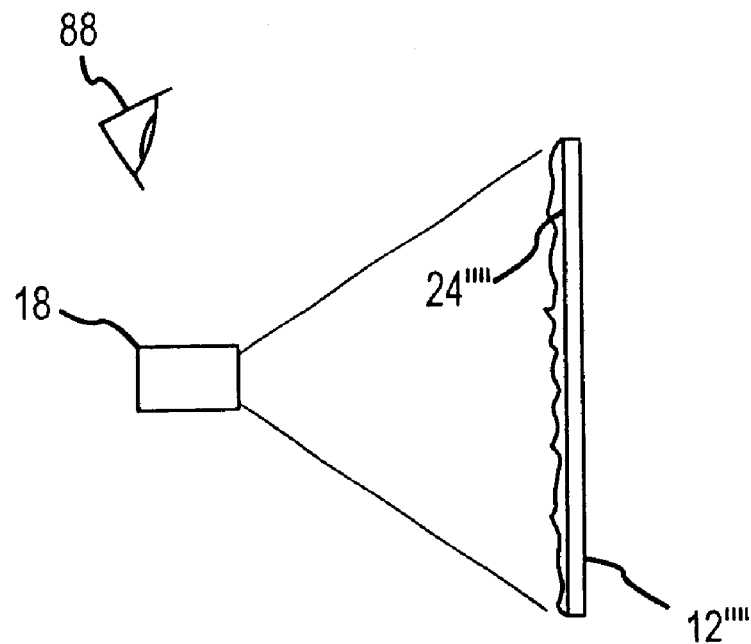

With particular reference to FIGS. 2A–2C, the frame 20 comprises a rectangular base member 60 made of angle steel and that holds the reservoir 46, four vertical members 62A–62D that each have a lower end that is operatively connected to the rectangular base member 24, a pair of lintels 64A, 64B that respectively connect the upper ends of the vertical members 62A, 62B and the upper ends of vertical members 62C, 62D, a lower cross-member 66, and an upper cross member 68 made of angle steel. The upper cross member 68 serves as a mounting structure for the water manifold 42. In addition, the substrate 12 hangs from the upper cross member 68. As shown in FIG. 5, the substrate 12 is also attached to the vertical members 62A, 62C by a U-channel 72 that surrounds the edge of the substrate 12 and is glued or otherwise attached to the vertical members.

It should be a appreciated that numerous other frame structures are capable of supporting the projection substrate 12, water distribution system 14, and lighting system 16. Further, the frame 20 and other frame structures can be made from many different types and shapes of materials. Additionally, it should be appreciated that in certain situations a suitable frame may support fewer, different or more elements of a projection system within the scope of the present invention. For instance, in an application that does not require a recirculating water system, a suitable frame would only be needed to support a water manifold adapted to be connected to a source of flowing water and a substrate in the proper orientation to one another. As another example, in certain applications, it may be desirable to have a frame that supports the projector, in addition to other elements of the projection system. It should also be appreciated that in some applications a frame may be unnecessary because the existing environment provides structural supports that permit the components of the projection system to be supported and properly oriented to one another. In addition, it should also be appreciated that, while the frame 20 supports the substrate 12 in a substantially vertical orientation, other orientations of the substrate 12 are feasible and a frame can be adapted to support the substrate in such orientations.

Figure 6A:
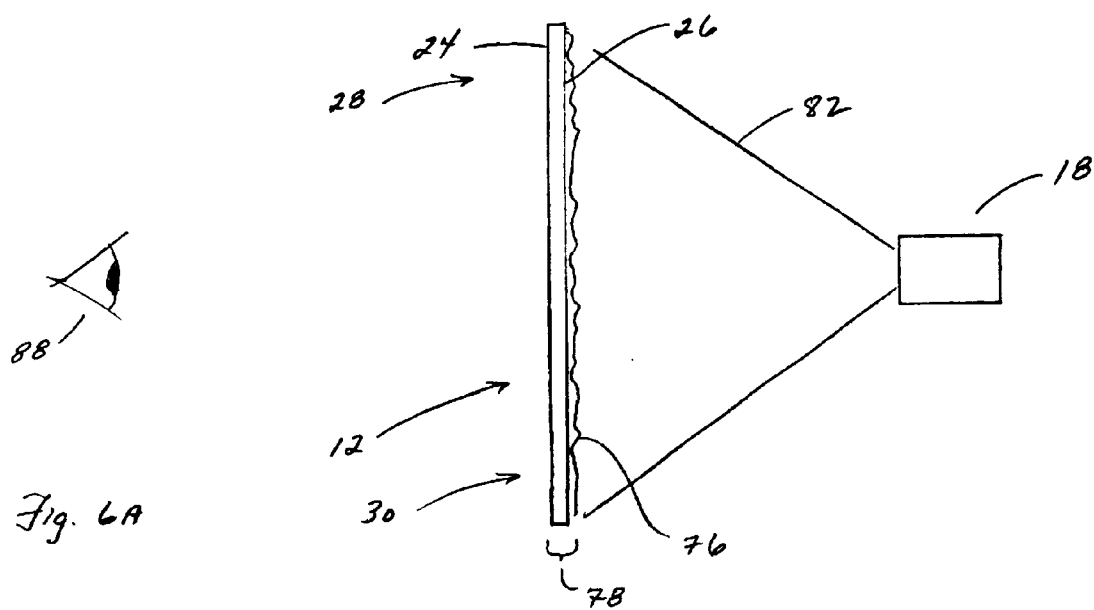
FIG. 6A is a side, free-body diagram showing the relationship of the projection screen formed by a projection substrate and rippling water and projector for the embodiment of the invention shown in FIG. 1 to an observer.
Figure 6B:
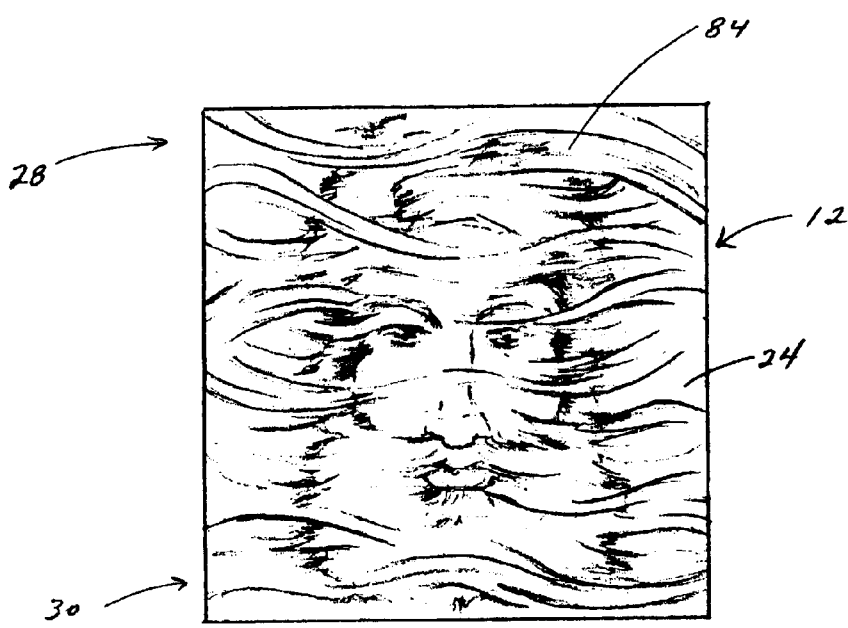
FIG. 6B is a front view of the projection screen shown in FIG. 6A with an example of a "shimmering" image.

With reference to FIGS. 6A–6B, operation of the system 10 is described. Operation of the system 10 comprises: (a) charging the system 10 with water, which typically involves placing water in the reservoir 46; and (b) activating the pump 48 to move water from the reservoir 46 to the manifold 42 via the piping 50. If desired, the water can be colored. The manifold 42 outputs, via the holes 44, multiple and substantially equal streams of water that engage the area 32 on the back side 26 of the substrate 12. The texture in the area 32 causes the multiple streams of water to spread and merge, thereby forming a substantially even sheet of water. As the sheet of water flows down the back side 26 of the substrate, the flow disturbance structure 34 creates a rippling sheet of water 76. The substrate 12 and rippling sheet of water 76 form a projection screen 78. The projection screen 78 operates to produce an image on the front side 24 of the substrate 12 that is corrupted or distorted relative to the image output by the projector 18. In FIG. 6A, an undistorted image of the head of a bearded man 82 is output by the projector 18. As shown in FIG. 6B, the undistorted image is corrupted or distorted by the operation of the screen 78 such that a "shimmering" image of the head of a bearded man 84 is produced on the front surface 24 and can be seen by a viewer 88. Because the front side 24 of the substrate is dry, the viewer 88 can touch the front side 24 of the substrate 12 without affecting the image 84. If desired, the lighting system 16 can be activated to further accentuate the effect of the rippling sheet of water 76. Alternatively, the lighting system 16 can be activated and used without the projector to create abstract visually effects, such as the "lava" effect previously noted.

Figure 7A:
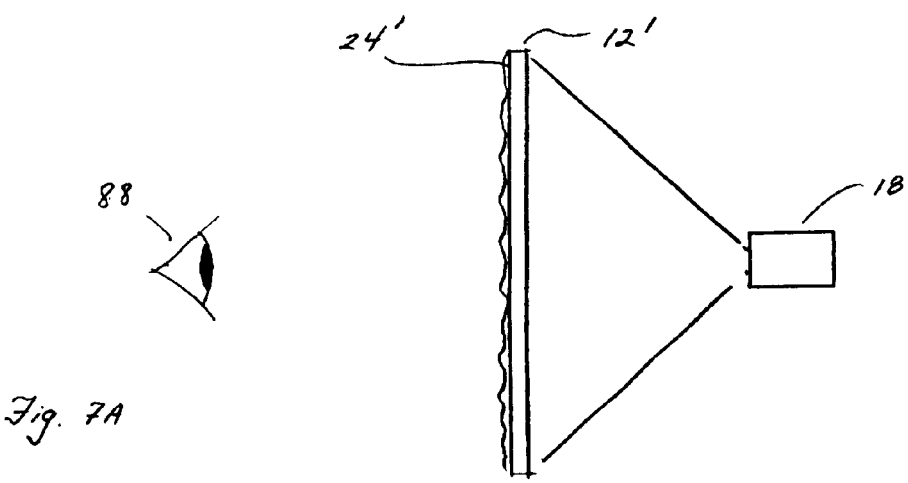
FIG. 7A is a side, free-body diagram of an alternative embodiment of the invention that employs a translucent projection substrate with a flow disturbance structure on the front or viewer side of the substrate rather than on the back side of the substrate.

With reference to FIG. 7A, an alternative embodiment of the invention is described. The alternative embodiment primarily differs from the system 10 in that a translucent substrate 12' is provided with a flow disturbance structure on the front or viewer side 24' of the substrate 12'. Further, the water distribution system is adapted to distribute water over the front side 24' of the substrate 12'.

Figure 7B:
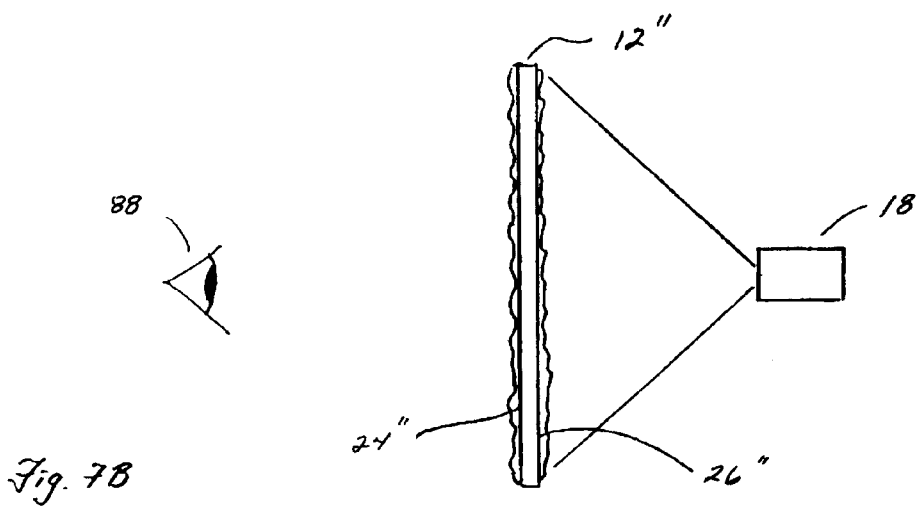
FIG. 7B is a side, free-body diagram of an alternative embodiment of the invention that employs a translucent projection substrate with flow disturbance structures on the front or viewer side of the substrate and on the back side of the substrate.

FIG. 7B illustrates another alternative embodiment of the invention that differs from the system 10 in that a translucent substrate 12" is provided with a flow disturbance structure that extends over both the front side 24" and the back side 26" of the substrate 12". The water distribution system is also adapted to distribute water over both sides of the substrate 12". By having flow disturbance structure over both sides of the substrate 12", an additive distorting effects are realized, i.e., the distortion of the image seen by the viewer 88 is the result of the distorting effect of the water flowing over the portion of the flow disturbance structure associated with the back side 26" of the substrate 12" and the distorting effect of the water flowing over the portion of the flow disturbance structure associated with the front side 24" of the substrate 12". Typically, the two portions of the flow disturbance structure are chosen to produce different types of ripples.

Figure 7C:
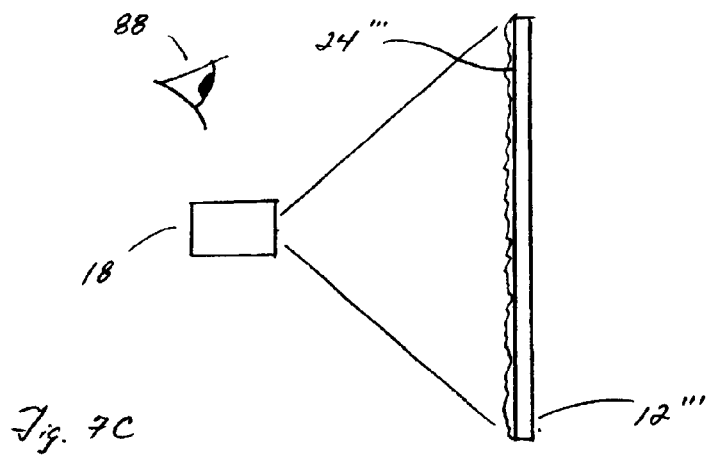
FIG. 7C is a side, free-body diagram of an alternative embodiment of the invention that employs a translucent projection substrate with a flow disturbance structure on the front or viewer side of the substrate and the projector situated to project an image towards the front side of the substrate.

FIG. 7C illustrates an alternative embodiment of the invention that differs from the system 10 in that a translucent substrate 12''' is provided with a flow disturbance structure on the front or viewer side 24''' of the substrate 12'''. Further, the projector 18 is located on the front or viewer side 24''' of the substrate 12'''. In operation, the projector 18 projects an image towards the front side 24''' of the substrate 12'''. The screen formed by the rippling water and the substrate 12''' interacts with the image so that a distorted or corrupted image is reflected back towards the viewer 88.

Figure 7D:
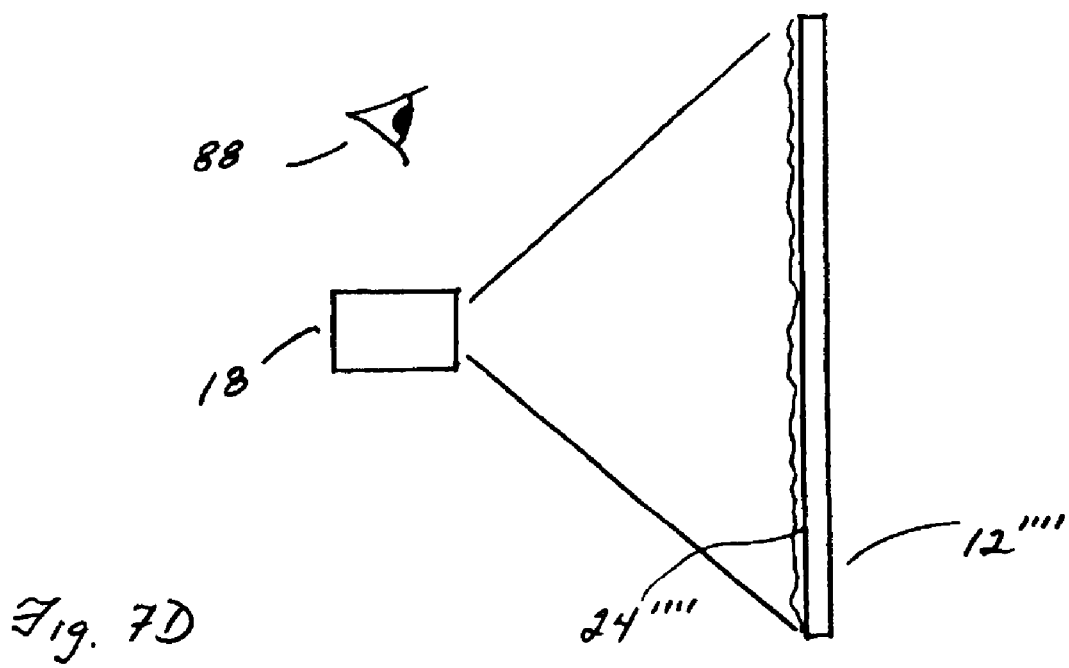
FIG. 7D is a side, free-body diagram of an alternative embodiment of the invention that employs a reflective projection substrate with a flow disturbance structure on the front or viewer side of the substrate and the projector situated to project an image towards the front side of the substrate.
Figure 1A:
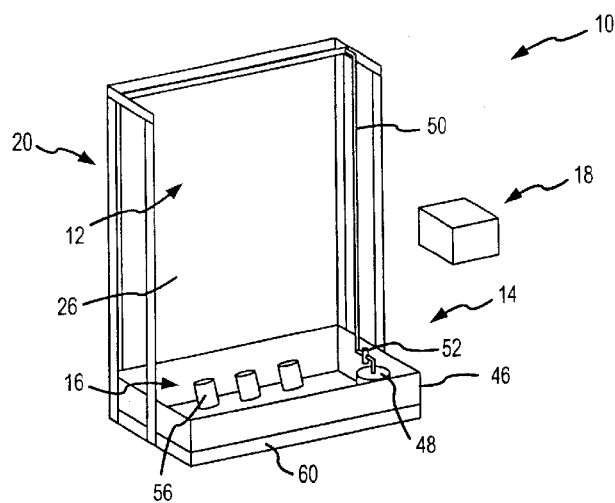
Figure 1B:
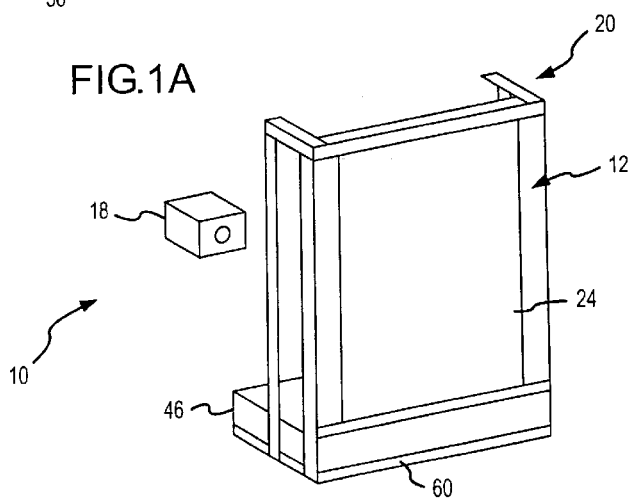

With reference to FIG. 7D, an alternative embodiment of the invention is described that differs from the system 10 in a number of ways. The alternative embodiment employs a substrate 12"" that is reflective rather than translucent. As a consequence, the flow disturbance structure is associated with the front or viewer side 24"" of the substrate 12"" and the water distribution system is adapted to distribute water over the front side 24"" of the substrate 12"". Further, the projector 18 is located on the front or viewer side 24"" of the substrate 12"". In operation, the projector 18 projects an image towards the front side 24"" of the substrate 12"". The screen formed by the rippling water and the substrate 12"" interacts with the image so that a distorted or corrupted image is reflected back towards the viewer 88.

The embodiments of the invention described hereinabove is intended to explain the best mode known of practicing the invention and to enable others skilled in the art to utilize the invention.

What is claimed is:

1. A projection system comprising:
   a projection substrate comprising a front side from which a viewer views an image, a back side from which a viewer does not typically view an image, and a flow disturbance structure for causing water that travels over at least one of said front side and said back side to have a rippling characteristic;
   a water system for providing water to flow over at least one of said front side and said back side of said projection substrate so as to interact with said flow disturbance structure; and
   a projector for projecting an image towards said projection substrate comprising a lamp and an image holder for placing an image between said lamp and said projection substrate;
   wherein, during operation, said flow disturbance structure causing water that travels over said flow disturbance structure to produce a water ripple that interacts with an image projected by said projector to produce a perceptibly distorted image relative to an image in said image holder of said projector.

2. A projection system, as claimed in claim 1, further comprising:
   a lighting structure for projecting light at an angle to one of said front side and said back side such that, during operation, water traveling over one of said front side and said back side with said rippling characteristic has brightness variations when viewed on said projection substrate.

3. A projection system, as claimed in claim 1, wherein:
said flow disturbance structure comprises a groove in one of said front side and said back side.

4. A projection system, as claimed in claim 1, wherein:
said flow disturbance structure comprises a bump associated with one of said front side and said back side.

5. A projection system, as claimed in claim 4, wherein:
said bump comprises an appliqué.

6. A projection system, as claimed in claim 1, wherein:
said projection substrate is translucent.

7. A projection system, as claimed in claim 6, wherein:
said flow disturbance structure is associated with said front side of said projection substrate; and
said projector is located so that said front side of said projection substrate is located between said projector and said back side of said projection substrate.

8. A projection system, as claimed in claim 6, wherein:
said flow disturbance structure is associated with either or both of said front side and said back side of said projection substrate; and
said projector is located so that said back side of said projection substrate is located between said projector and said front side of said projection substrate.

9. A projection system, as claimed in claim 1, wherein:
said projection substrate is reflective;
said flow disturbance structure is associated with said front side of said projection substrate; and
said projector is located so that said front side of said projection substrate is located between said projector and said back side of said projection substrate.

10. A projection system comprising:
    a translucent projection substrate comprising a front side from which a viewer views an image, a back side from which a viewer does not typically view an image, and a flow disturbance structure for causing water that travels over at least one of said front side and said back side to have a rippling characteristic;
    a water system for providing water to flow over at least one of said front side and said back side of said translucent projection substrate so as to interact with said flow disturbance structure; and
    a projector for projecting an image towards said projection substrate comprising a lamp and an image holder for placing an image between said lamp and said translucent projection surfaces;
    wherein, during operation, said flow disturbance structure causing water that travels over said flow disturbance structure to produce a water ripple that interacts with an image projected by said projector to produce a perceptibly distorted image relative to an image in said image holder of said projector.

11. A projection system, as claimed in claim 10, wherein:
one of said front side and said back side of said translucent projection substrate is frosted.

12. A projection system, as claimed in claim 10, wherein:
both said front side and said back side of said translucent projection substrate are frosted.

13. A projection system, as claimed in claim 10, wherein:
said flow disturbance structure is associated with said front side of said translucent projection substrate; and said projector is located so that said back side of said translucent projection substrate is located between said projector and said front side of said translucent projection substrate.

14. A projection system, as claimed in claim 10, wherein:

said flow disturbance structure is associated with said back side of said translucent projection substrate; and said projector is located so that said back side of said translucent projection substrate is located between said projector and said front side of said translucent projection substrate.

15. A projection system, as claimed in claim 10, wherein:

said flow disturbance structure is associated with both of said front side and said back side of said translucent projection substrate; and said projector is located so that said back side of said translucent projection substrate is located between said projector and said front side of said translucent projection substrate.

16. A projection system, as claimed in claim 10, wherein:

said flow disturbance structure is associated with said front side of said translucent projection substrate; and said projector is located so that said front side of said translucent projection substrate is located between said projector and said back side of said translucent projection substrate.

17. A projection system comprising:

a translucent projection substrate comprising a front side from which a viewer views an image, a back side from which a viewer does not typically view an image, and a flow disturbance structure for causing water that travels over one of said front side and said back side to have a rippling characteristic;

a water system for providing water to flow over one of said front side and said back side so as to interact with said flow disturbance structure; and a lighting structure for projecting light at an angle to one of said front side and said back side such that, during operation, water traveling over one of said front side and said back side with said rippling characteristic is engaged by light from said lighting structures;

wherein, during operation, said flow disturbance structure causing water that travels over said flow disturbance structure to produce a water ripple that interacts with light produced by said lighting structure to produce an image for a viewer in which there is a perceptible change in brightness of the image that correlates to the crest of a water ripple.

18. A projection system, as claimed in claim 17, wherein:

said lighting structure comprises a light for producing light of a color other than white.

19. A projection system, as claimed in claim 18, further comprising:

a projector for projecting an image towards said translucent projection substrate comprising a lamp, a lens, and an image holder for placing an image between said lamp and said lens.

20. A projection system comprising:

a translucent projection substrate comprising a front side from which a viewer views an image, a back side from which a viewer does not typically view an image, and a flow disturbance structure for causing water that travels over said back side to have a rippling characteristic;

a water system comprising a water manifold located adjacent to said top end of said translucent projection substrate and for distributing water over said back side of said translucent projection substrate, a water reservoir located adjacent to said bottom end of said translucent projection substrate, and a pump for moving water from said water reservoir to said water manifold;

a lighting structure for projecting light at an angle to said back side of said translucent projection substrate such that, during operation, water traveling over said back side and having said rippling characteristic has brightness variations over said translucent projection surface; and a projector for projecting an image towards said back side of said translucent projection substrate comprising a lamp, a lens, and an image holder for placing an image between said lamp and said lens;

wherein, during operation, said flow disturbance structure causing water that travels over said flow disturbance structure to produce a water ripple that interacts with a projector image produced by said projector to produce a perceptibly distorted image for a viewer relative said projector image.

\* \* \* \* \*

UNITED STATES PATENT AND TRADEMARK OFFICE
CERTIFICATE OF CORRECTION

PATENT NO.    : 6,731,429 B2
DATED         : May 4, 2004
INVENTOR(S)   : Montgomery C. Lunde It is certified that error appears in the above-identified patent and that said Letters Patent is hereby corrected as shown below:

Delete the specification and substitute therefor the attached specifciation.
Replace figures 1-8 with the attached drawings and insert figure 9.

Drawings,
Delete "Sheet 1 of 8", and insert -- Sheet 1 of 9 --;
Delete "Sheet 2 of 8", and insert -- Sheet 2 of 9 --;
Delete "Sheet 3 of 8", and insert -- Sheet 3 of 9 --;
Delete "Sheet 4 of 8", and insert -- Sheet 4 of 9 --;
Delete "Sheet 5 of 8", and insert -- Sheet 5 of 9 --;
Delete "Sheet 6 of 8", and insert -- Sheet 6 of 9 --;
Delete "Sheet 7 of 8", and insert -- Sheet 7 of 9 --;
Delete "Sheet 8 of 8", and insert -- Sheet 8 of 9 --;

Column 9,
Line 41, delete "structures", and insert -- structure --.

Signed and Sealed this

Seventh Day of September, 2004

JON W. DUDAS
*Director of the United States Patent and Trademark Office*

(12) United States Patent
Lunde

(10) Patent No.: US 6,731,429 B2
(45) Date of Patent: May 4, 2004

(54) PROJECTION SYSTEM EMPLOYING A SCREEN WITH MOVING WATER

(75) Inventor: Montgomery C. Lunde, Santa Clarita, CA (US)

(73) Assignee: Technifex, Inc., Valencia, CA (US)

(*) Notice: Subject to any disclaimer, the term of this patent is extended or adjusted under 35 U.S.C. 154(b) by 0 days.

(21) Appl. No.: 10/063,265

(22) Filed: Apr. 4, 2002

(65) Prior Publication Data

US 2003/0189753 A1 Oct. 9, 2003

(51) Int. Cl.$^7$ .................. G03B 21/56; G03B 21/60; G03B 21/00; G03B 21/26; F21S 8/00

(52) U.S. Cl. .................. 359/443; 359/460; 353/28; 353/122; 239/18

(58) Field of Search .................. 359/443, 460; 239/18; 353/122, 28, 62

(56) References Cited

U.S. PATENT DOCUMENTS

| | | | |
|---|---|---|---|
| 1,446,266 A | 2/1923 | Murray | 359/450 |
| 1,631,240 A | 6/1927 | Amet | 353/54 |
| 3,964,194 A | 6/1976 | Gugeler | 40/106.21 |
| 5,067,653 A | 11/1991 | Araki et al. | 239/18 |
| 5,167,368 A | 12/1992 | Nash | 239/17 |
| 5,288,018 A * | 2/1994 | Chikazumi | 239/18 |
| 5,445,322 A | 8/1995 | Formhals et al. | 239/18 |
| 5,989,128 A | 11/1999 | Baker et al. | 472/65 |
| 6,183,092 B1 * | 2/2001 | Troyer | 353/31 |
| 6,279,835 B1 | 8/2001 | Hansen | 239/20 |
| 6,414,789 B2 * | 7/2002 | Braun | 359/460 |

OTHER PUBLICATIONS

Midwest Tropical, "Aqua Falls", found at http://www.midwest-tropical.com/products/aquafall.htm, publication date unknown.

* cited by examiner

*Primary Examiner*—Christopher E Mahoney
(74) *Attorney, Agent, or Firm*—Holland & Hart LLP; Christopher J. Kulish, Esq

(57) ABSTRACT

The present invention is directed a projection system that produces a visual special effect. In one embodiment, the system includes a projector, a translucent projection substrate, a flow disturbance structure associated with one side of the substrate, and a water system for distributing water over the side of the substrate with which the flow disturbance structure is associated.

20 Claims, 9 Drawing sheets

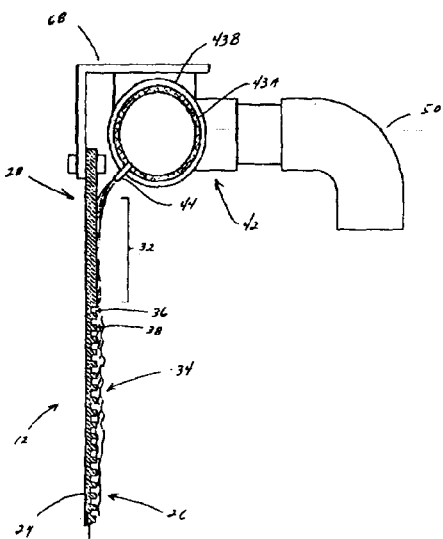

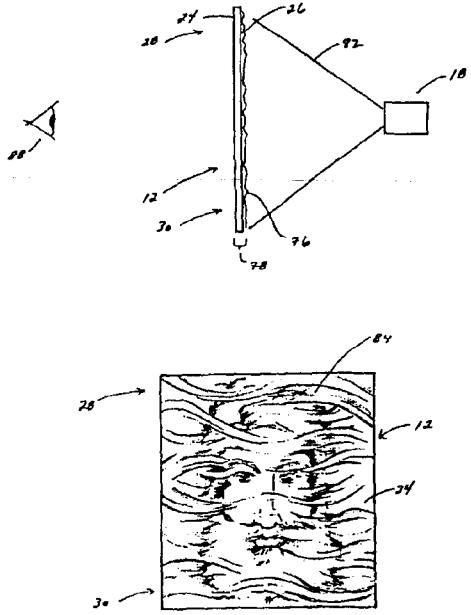

UNITED STATES PATENT AND TRADEMARK OFFICE
CERTIFICATE OF CORRECTION

PATENT NO. : 6,731,429 B2
DATED : May 4, 2004
INVENTOR(S) : Montgomery C. Lunde

It is certified that error appears in the above-identified patent and that said Letters Patent is hereby corrected as shown below:

<u>Column 8,</u>
Line 49, delete "surfaces;", and insert -- substrate; --.

Signed and Sealed this

Eleventh Day of October, 2005

JON W. DUDAS
*Director of the United States Patent and Trademark Office*